THOMAS J. BELFORD, OF WORTHINGTON, OHIO.

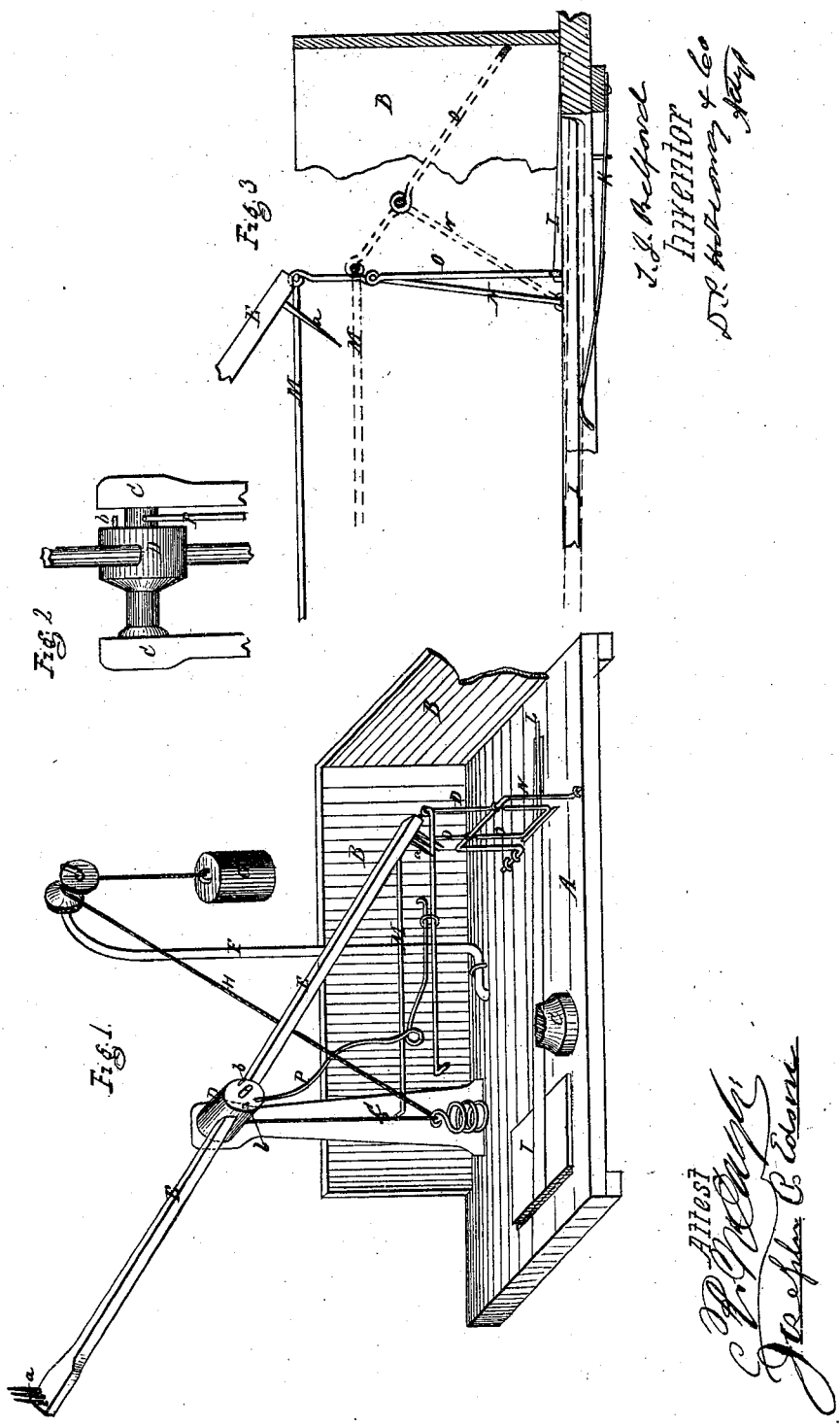
T. J. Belford,
Animal Trap.
No. 87,022.   Patented Feb. 16, 1869.

Letters Patent No. 87,022, dated February 16, 1869.

IMPROVED ANIMAL-TRAP.

The Schedule referred to in these Letters Patent and making part of the same.

*To all whom it may concern:*

Be it known that I, THOMAS J. BELFORD, of Worthington, in the county of Franklin, and State of Ohio, have invented a new and useful Improvement in Traps for Vermin; and I do hereby declare that the following is a full, clear, and exact description of the same, reference being had to the annexed drawings, making part of this specification, in which—

Figure 1 is a perspective view of my improved trap, with a portion of its enclosure broken away, for the purpose of showing the mechanism.

Figure 2 is a front elevation, showing the pin for re-setting the trap after it has been unsprung.

Figure 3 is a side elevation of the parts which retain the trap in position for the reception of the animal, the black lines showing the parts in such position, and the red lines showing them in the position they assume upon the springing of the trap.

Corresponding letters refer to corresponding parts in the several figures.

This invention relates to an improvement in traps for animals; and

It consists in the combination and arrangement of the parts of which it is composed, as will be more fully explained hereafter.

A, in the drawings, represents a platform, or bed, having an enclosure, B, surrounding or partially surrounding it, as shown in fig. 1 of the drawings.

From this platform, two columns, or posts, project upward, and support, by their upper ends, a cross-shaft, D, from which extend, in opposite directions, the arms E E, whose outer ends are provided with spikes, a, pointed at their outer ends, for a purpose to be hereinafter explained.

To the hub D of the shaft, a cord, or rope, is secured, by means of a staple, which is to be coiled around the shaft a sufficient number of times to give the shaft and its projecting arms the desired number of rotations as it unwinds.

This operation is performed by means of the cord, or rope, H, which may pass through an eye formed upon a spiral spring located underneath said shaft, and thence over a pulley, or roller, secured to the upper portion of the standard F, as shown in fig. 1 of the drawings or the rope may pass directly to the roller, without being put through the spring.

To the outer end of the above-described rope, the weight G is attached, for the purpose of giving motion to the arms F F.

I is a treadle, which is hinged to the platform A in such a manner that its upper surface shall be "flush" with the upper surface of said platform, but so that it may be depressed below such surface, as the animal steps thereon, for the purpose of securing the "bait," which is to be secured to said treadle.

This treadle is to be located near the front or entrance-end of the trap, and is to have an arm extending therefrom, to near the front end thereof, which arm is to be pivoted, at its front end, to the platform A, at or near the same point where the spring K is pivoted, which spring acts upon the under side of said treadle, for the purpose of returning the same to its original position, after it has been pressed down by the weight of the animal.

L is a bar, or strip of metal, which is pivoted to the platform, at or near its rear end, and which is so arranged as to enter a slot, or groove, formed in the rear end of the arm above described, which slot, or groove, it traverses for a distance sufficient to bring its front end to the swinging frame O, the lower end of which enters a slight depression formed in the upper surface of bar L, for the purpose of holding the frame in position when the trap is set.

This frame O may be made of wire, or it may be of cast-metal, it being so constructed as to embrace the hinged staple or frame N at a point about two-thirds of the distance between its lower and its upper end, at which point it swings upon said frame N, which frame is hinged to the platform A.

The upper end of the frame O is hinged to the inner end of frame M, which, at its opposite end, is hinged to the standards C C, so that its inner end may rise and fall with the movements of the frame O.

P represents a wire or bent bar, which is pivoted to the standard C upon its inner face, and which is so formed as to constitute a bell-crank lever, the upper arm of which extends upwards, and comes in contact with pins b, which are secured to the hub of shaft D, while the opposite end of such lever extends forward in a horizontal line, and parallel with the swinging frame M, and to a point near the end of such frame, to which it is to be connected by means of a ring or strap, so that, as the upper end of said lever is moved, by the action of the pins in hub D, its motion will be communicated to said frame M, and, through it, to frame N, treadle I, and bar L.

The operation of my improved trap is as follows:

The parts being constructed and arranged as represented in fig. 1 of the drawings, the trap is ready for use, the parts being held in position by means of the frame O, which is secured in the notch formed in bar L, and also by the end of projecting arm F, which, it will be seen, comes in contact with the upper end of said frame, and thus prevents the weight from revolving the shaft D and its arms E E.

While the parts are in the position above described, no movement of any of them can take place; but, upon any animal attempting to remove the bait from treadles I, the same will be pressed downward, and thus the hold of the bar L upon frame O will be released, and the weight G, acting through the cord, or rope H, and arms F F, will cause the bevelled end of the one, which for the time is in contact with frame O, to press it out of the way, when the arms are free to rotate, which they do with great rapidity, until arrested by one of the pins in the hub D, which comes in contact with the upper end of lever P, which action returns the parts to their original positions, when the further motion will be arrested by one of the arms coming in contact with the frame O.

It will be apparent that, as the parts are released, and the arms permitted to rotate, by the action of the animal in endeavoring to secure the bait, the action of the sharpened spikes in the ends of such arms will be to penetrate the animal, and thus cause its death, while, at the same time, it will be thrown out of the way, and the trap, through its own automatic action, will reset itself, and be in readiness to repeat the operation as often as may be required, limited only by the length of the cord, or rope.

I am aware that a patent was granted to James Sherwood, March 30, 1851, and also one to E. H. Crane, August 23, 1859, which, in some of their features, resemble mine; but, as I do not claim to be the inventor of the specific devices composing my device, but only the combination and arrangement of such devices, I disclaim anything which may belong to the parties above named.

Having thus described my invention,

What I claim, and desire to secure by Letters Patent, is—

1. The combination and arrangement of the treadle I, bar L, hinged frame or staple N, frames O and M, lever P, and arms F F, substantially as shown and described.

2. The arrangement of the swinging frame O, with reference to the bar L and arms E E, as a consequence of which the parts are held in position when not in motion, and by which the motion of the arms is arrested when in motion, substantially as shown and described.

In testimony whereof, I have signed my name to this specification, in the presence of two subscribing witnesses.

THOMAS J. BELFORD.

Witnesses:
   I. N. CASE,
   C. HASTINGS.